(12) United States Patent
Yu et al.

(10) Patent No.: US 6,816,799 B2
(45) Date of Patent: Nov. 9, 2004

(54) VEHICLE OPERATING PARAMETER DETERMINATION SYSTEM AND METHOD

(75) Inventors: Jingsheng Yu, Northville, MI (US); Christian Breuninger, Kuenzelsau (DE)

(73) Assignee: Robert Bosch Corporation, Broadview, IL (US)

(*) Notice: Subject to any disclaimer, the term of this patent is extended or adjusted under 35 U.S.C. 154(b) by 0 days.

(21) Appl. No.: 10/617,085

(22) Filed: Jul. 10, 2003

(65) Prior Publication Data

US 2004/0024565 A1 Feb. 5, 2004

Related U.S. Application Data

(60) Provisional application No. 60/408,162, filed on Sep. 4, 2002, and provisional application No. 60/401,124, filed on Aug. 5, 2002.

(51) Int. Cl.$^7$ ............................................. G01C 17/38
(52) U.S. Cl. ............................................ 702/94; 701/41
(58) Field of Search ............................. 702/94; 701/41, 701/42, 34

(56) References Cited

U.S. PATENT DOCUMENTS

| | | | |
|---|---|---|---|
| 3,608,925 A | 9/1971 | Murphy | |
| 3,895,816 A | 7/1975 | Takahashi et al. | |
| 4,313,529 A | 2/1982 | Kato et al. | |
| 4,345,661 A | 8/1982 | Nishikawa | |
| 4,392,540 A | 7/1983 | Michio et al. | |
| 4,555,126 A | 11/1985 | Ishimitsu et al. | |
| 4,564,214 A | 1/1986 | Tokunaga et al. | |
| 4,575,116 A | 3/1986 | Miyata | |
| 4,621,833 A | 11/1986 | Soltis | |
| 4,652,011 A | 3/1987 | Hollerweger et al. | |
| 4,690,431 A | 9/1987 | Ito et al. | |
| 4,706,771 A | 11/1987 | Kawabe et al. | |
| 4,706,979 A | 11/1987 | Kawabe et al. | |
| 4,718,685 A | 1/1988 | Kawabe et al. | |
| 4,720,791 A | 1/1988 | Daido | |
| 4,722,545 A | 2/1988 | Gretz et al. | |
| 4,767,588 A | 8/1988 | Ito | |
| 4,803,629 A | 2/1989 | Noto et al. | |
| 4,834,204 A | 5/1989 | Ito et al. | |
| 4,836,319 A | 6/1989 | Haseda et al. | |
| 4,840,389 A | 6/1989 | Kawabe et al. | |
| 4,856,607 A | 8/1989 | Sueshige et al. | |

(List continued on next page.)

FOREIGN PATENT DOCUMENTS

| | | |
|---|---|---|
| DE | 4015618 A1 | 11/1991 |
| DE | 4130142 A1 | 3/1993 |
| EP | 0 321 082 A2 | 11/1988 |
| EP | 0 359 673 A2 | 9/1989 |
| EP | 0 546 789 A2 | 12/1992 |
| JP | 3-128768 | 5/1991 |
| JP | 4-252912 | 9/1992 |
| JP | 6-255530 | 9/1994 |

*Primary Examiner*—John Barlow
*Assistant Examiner*—Stephen J. Cherry
(74) *Attorney, Agent, or Firm*—Baker & Daniels

(57) ABSTRACT

A system and method for estimating an operating parameter of a vehicle such as the steering angle offset or body slip angle. The method includes providing a dynamic vehicle model which is valid when the yaw rate and slip angle of the vehicle are either constant or changing. The vehicle model is reformulated to allow for the direct estimation of the steering angle offset value and/or the body slip angle. Estimation of an operating parameter of the vehicle may also include the use of a model difference term which is defined by the difference between a value estimated using the model and a measured value. A method for filtering the steering angle offset value is also provided. The filtering method may utilize a variable filter coefficient which varies in response to changes in the dynamic behavior of the vehicle.

18 Claims, 6 Drawing Sheets

U.S. PATENT DOCUMENTS

| | | |
|---|---|---|
| 4,867,466 A | 9/1989 | Soltis |
| 4,882,693 A | 11/1989 | Yopp |
| 4,884,647 A | 12/1989 | Mimuro et al. |
| 4,939,654 A | 7/1990 | Kouda et al. |
| 4,947,328 A | 8/1990 | Sugasawa |
| 4,961,474 A | 10/1990 | Daido et al. |
| 4,996,657 A | 2/1991 | Shiraishi et al. |
| 4,999,776 A | 3/1991 | Soltis et al. |
| 5,001,637 A | 3/1991 | Shiraishi et al. |
| 5,032,996 A | 7/1991 | Shiraishi |
| 5,065,323 A | 11/1991 | Shiraishi et al. |
| 5,065,324 A | 11/1991 | Oshita et al. |
| 5,121,322 A | 6/1992 | Shiraishi et al. |
| 5,243,188 A | 9/1993 | Hattori et al. |
| 5,253,172 A | 10/1993 | Ito et al. |
| 5,311,432 A | 5/1994 | Momose |
| 5,343,393 A | 8/1994 | Hirano et al. |
| 5,422,810 A | 6/1995 | Brunning et al. |
| 5,434,784 A | 7/1995 | Bradley et al. |
| 5,465,210 A | 11/1995 | Walenty |
| 5,732,372 A | 3/1998 | Marsden |
| 5,787,375 A | 7/1998 | Madau et al. |
| 5,790,966 A | 8/1998 | Madau et al. |
| 6,130,706 A | 10/2000 | Hart, Jr. et al. |
| 6,223,116 B1 | 4/2001 | Kin et al. |
| 6,233,505 B1 | 5/2001 | Kranz et al. |
| 6,233,513 B1 | 5/2001 | Furukawa et al. |
| 6,345,218 B1 | 2/2002 | Yamanaka et al. |
| 6,349,256 B1 | 2/2002 | Kin et al. |
| 6,405,113 B1 | 6/2002 | Yamawaki et al. |

VEHICLE OPERATING PARAMETER DETERMINATION SYSTEM AND METHOD

CROSS REFERENCE TO RELATED APPLICATIONS

This application claims priority under 35 U.S.C. 119(e) of both U.S. provisional patent application Ser. No. 60/408,162 filed on Sep. 4, 2002 entitled VEHICLE OPERATING PARAMETER DETERMINATION METHOD and U.S. provisional patent application Ser. No. 60/401,124 filed on Aug. 5, 2002 entitled VEHICLE OPERATING PARAMETER DETERMINATION METHOD the disclosures of both of which are hereby incorporated herein by reference.

BACKGROUND OF THE INVENTION

1. Field of the Invention

The present invention relates to methods for determining operating parameters of a motor vehicle and, more particularly, to the estimation of the steering angle position and body slip angle of a vehicle based upon data received from various vehicle sensors.

2. Description of the Related Art

Many motor vehicles today have electronic stability program ("ESP") systems which include an electronic controller which utilize data signals obtained from various vehicle sensors to make complex calculations and automatically implement actions based upon those calculations.

One of the values that is generally required by such ESP systems is the vehicle steering angle position which may be measured by a steering angle sensor ("SAS"). There are different classes of SAS sensors. Some SAS sensors, such as Class III sensors, provide accurate values immediately after the ignition key is placed in the ON condition. Other SAS sensors, such as Class I sensors, provide values which are relative to the position of the steering wheel when the ignition key is turned to the ON condition. In other words, these sensors transmit a zero value signal when the key ON condition is initiated regardless of the actual steering angle position and processing of the SAS signal is required to compute an accurate steering angle value. A variety of different methods are known for processing a relative position SAS signal to estimate the actual steering angle.

The slip angle of the vehicle body, i.e., the angle between the vehicle travel direction and the vehicle heading, is another operating parameter of the vehicle which has an impact on the stability of the motor vehicle and may be used by a stability control system.

SUMMARY OF THE INVENTION

The present invention provides improved methods and systems for estimating the body slip angle and actual steering angle position of a motor vehicle based upon signals received from various vehicle sensors.

Vehicle dynamics models oftentimes include a variable representing the steering angle value of the vehicle. In vehicles having a relative position steering angle sensor the absolute or true steering angle, $\delta$, is equal to the sum of the relative steering angle position, $\delta_{Uncenter}$, provided by the steering angle sensor, and the steering angle offset, $\delta_{off}$, this relationship is represented by the following equation:
$\delta = \delta_{Uncenter} + \delta_{off}$.

The inventors of the present application have developed a method of directly estimating the steering angle offset value which recognizes that, because the steering angle offset value is a constant value during any one discrete vehicle trip, the sum of the relative value of the steering angle and the offset may be substituted for the absolute steering angle value in a vehicle dynamics model. The inventors of the present invention have also utilized such substitutions to develop vehicle models which provide a mathematical expression in which the steering angle offset value, $\delta_{off}$, is a state variable and can be directly estimated from the mathematical expression. As used herein, a variable is a state variable with respect to a particular mathematical expression when it can be directly calculated from such mathematical expression.

After reformulating the vehicle model so that the steering angle offset value, $\delta_{off}$, is a state variable, the Kalman filter or a state observer may be applied to the reformulated vehicle model to facilitate the estimation of the steering angle offset value, $\delta_{off}$. The mathematical expression provided by the application of the Kalman filter or state observer to the reformulated vehicle model may also be used to provide for the estimation of other vehicle operating parameters such as the vehicle body slip angle and yaw rate. The measured vehicle operating parameters which form the input values for such mathematical expressions may include the relative steering angle position, yaw rate, longitudinal speed, and lateral acceleration of the vehicle.

The inventors of the present application have also developed a method for filtering the resulting values of the steering angle offset which uses a variable filter coefficient and which may also be used with alternative methods of estimating steering angle offset values. The filter coefficient is dependent upon an uncertainty factor which is defined so that it will vary with the dynamic behavior of the vehicle. The vehicle operating parameters which may be used in the determination of the uncertainty factor include the yaw rate, steering angle position and the lateral acceleration of the vehicle.

The invention comprises, in one form thereof, a system and/or method for estimating a steering angle offset value in a motor vehicle having a relative position steering angle sensor. The method includes providing a mathematical expression for calculating an estimated steering angle offset value, $\hat{\delta}_{off}$, based upon at least one measured value of a vehicle operating parameter. The mathematical expression is definable by selecting a mathematical model to describe the dynamic behavior of the vehicle which includes a first variable, $\delta$, representing the steering angle of the vehicle; and substituting, for the first variable, $\delta$, the sum of a second variable, $\delta_{Uncenter}$, representing the relative steering angle position and a third variable, $\delta_{off}$, representing the steering angle offset in the model to thereby provide the mathematical expression for calculating the estimated steering angle offset value, $\hat{\delta}_{off}$. The method also includes obtaining the at least one measured value for the vehicle and estimating the steering angle offset value using the at least one measured value and the mathematical expression.

The at least one measured value of the method may include the yaw rate of the vehicle, the relative steering angle position and the longitudinal velocity of the vehicle. The lateral acceleration of the vehicle may also be included in the measured values used with this method.

In alternative embodiments of this invention, the slip angle of the vehicle body may also be estimated from the mathematical expression provided by this method.

In one embodiment, the model used by this method may be equation (1.1) presented below and the substitution of the sum of the second and third variables into the model may result in equation (1.3) which is also presented below. The mathematical expression provided by the method may comprise either equation (1.4) or (1.6) which are presented below.

The method may also include a filtering process which uses a variable filter coefficient. The variable filter coefficient may be calculated using an uncertainty factor which is determined using at least one value from the group including the yaw rate of the vehicle, the relative steering angle position and the lateral acceleration of the vehicle.

The invention comprises, in another form thereof, a system and method for filtering a plurality of time indexed values in a process for determining a steering angle position of a vehicle having a relative steering angle sensor. The method includes estimating a plurality of time indexed steering angle offset values. The method also includes filtering a plurality of time indexed values which are a function of said plurality of time indexed steering angle offset values using a variable filter coefficient, $F_k$. The variable filter coefficient, $F_k$, is determined using an uncertainty factor, $U_k$. The uncertainty factor, $U_k$, is determined using at least one value from the group including the yaw rate of the vehicle, the relative steering angle position and the lateral acceleration of the vehicle.

For some embodiments of this method, the plurality of time indexed values are identical to the plurality of time indexed steering angle offset values. The uncertainty factor, $U_k$, may be determined using equation (2.5) presented below and the filtering of values may use equation (2.1) presented below.

The invention comprises, in still another form thereof, a system and method of controlling a vehicle. The method includes providing a mathematical expression for estimating first and second vehicle operating parameters. The mathematical expression is definable by selecting a mathematical model to describe the dynamic behavior of the vehicle and reformulating the model. The mathematical expression includes a model difference term which is dependent upon a difference between an estimated value of the second vehicle operating parameter and a measured value of the second vehicle operating parameter. A signal representing a measured value of the second vehicle operating parameter is obtained. The method also includes estimating the first vehicle operating parameter using the mathematical expression wherein calculation of an estimated value for the first parameter includes using the measured value represented by the signal in the model difference term. The estimated value of the first parameter is then output for use in the vehicle's electronic control system.

The method may include first and second parameters which are selected from the group including the steering angle offset, the yaw rate and the body slip angle of the vehicle. In one embodiment of the invention, the first parameter is the steering angle offset and the second parameter is the yaw rate of the vehicle. The mathematical expression used to estimate the first parameter may be equation (1.6a) which is presented below.

The invention comprises, in another form thereof, a system and/or method for estimating a vehicle body slip angle which includes the use of vehicle dynamics model which is valid under operating conditions wherein the yaw rate or slip angle are changing to estimate the vehicle body slip angle. Different sets of input signals may be used with the model to perform the estimations. One such set of input signals, include signals representing the relative steering angle position, the longitudinal speed of the vehicle and the yaw rate of the vehicle. The lateral acceleration of the vehicle may also be included in the input signals. It is also possible for an input signal representing the absolute or actual steering angle position to be substituted for the signal representing the relative position steering angle position.

The present invention may be used with vehicles which include either an absolute position steering angle sensor (which provides a signal indicating the accurate steering angle position immediately upon starting the vehicle) or a relative position steering angle sensor (which requires the signal to be corrected to account for the steering angle offset).

For vehicles which have an absolute position steering angle sensor, embodiments of the present invention may be used to estimate the vehicle body slip angle. For vehicles which have a relative position steering angle sensor, alternative embodiments of the present invention may be used to estimate the steering angle offset value and/or the vehicle body slip angle. The present invention also provides a method for filtering the steering angle offset value.

An advantage of the present invention is that it provides a method for directly estimating both the body slip angle and the steering angle offset value of the vehicle.

Another advantage of the present invention is that it provides a relatively accurate value for the body slip angle and the steering angle position when the vehicle is in either a steady state or a non-steady state of operation. As used herein, a non-steady state of operation refers to a state of operation wherein the yaw rate or the body slip angle of the vehicle is changing.

Yet another advantage of the present invention is that it provides a method for estimating the body slip angle and steering angle which can utilize different sets of vehicle operating parameters as input data. For example, the method can be used to estimate the body slip angle and steering angle offset based upon the yaw rate, relative steering angle position and longitudinal velocity of the vehicle, or, the inputs may additionally include the lateral acceleration of the vehicle.

Still another advantage of the present invention is that it provides a filtering method for use in determining the steering angle offset which includes a variable filter coefficient wherein the filter coefficient varies in response to vehicle operating parameters which reflect the dynamic behavior of the vehicle such as the yaw rate, relative steering angle position and lateral acceleration of the vehicle.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
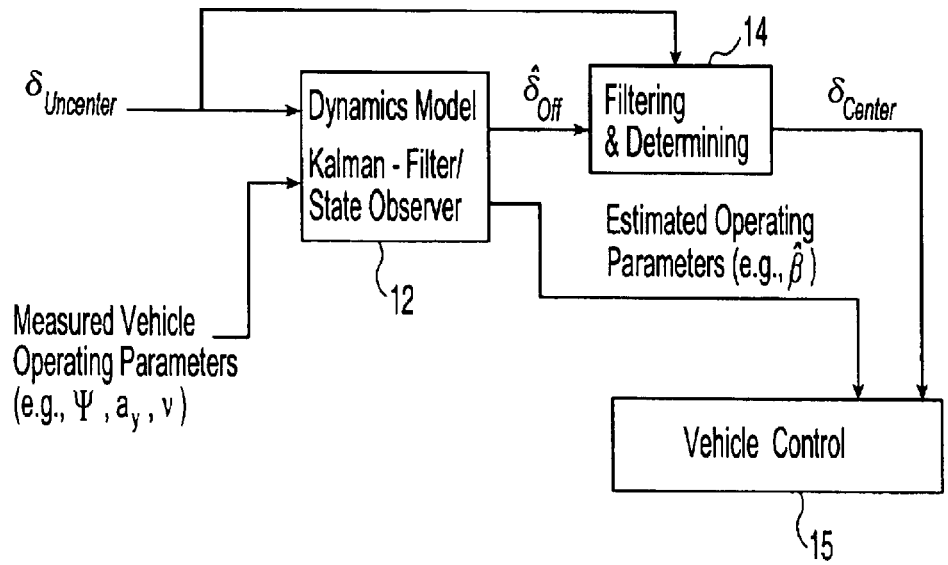
FIG. 1 is a flow chart representing one embodiment of the present invention.

Corresponding reference characters indicate corresponding parts throughout the several views. Although the exemplification set out herein illustrates the invention, in multiple forms, the embodiments disclosed below are not intended to be exhaustive or to be construed as limiting the scope of the invention to the precise forms disclosed.7

DESCRIPTION OF THE PRESENT INVENTION

Figure 9:
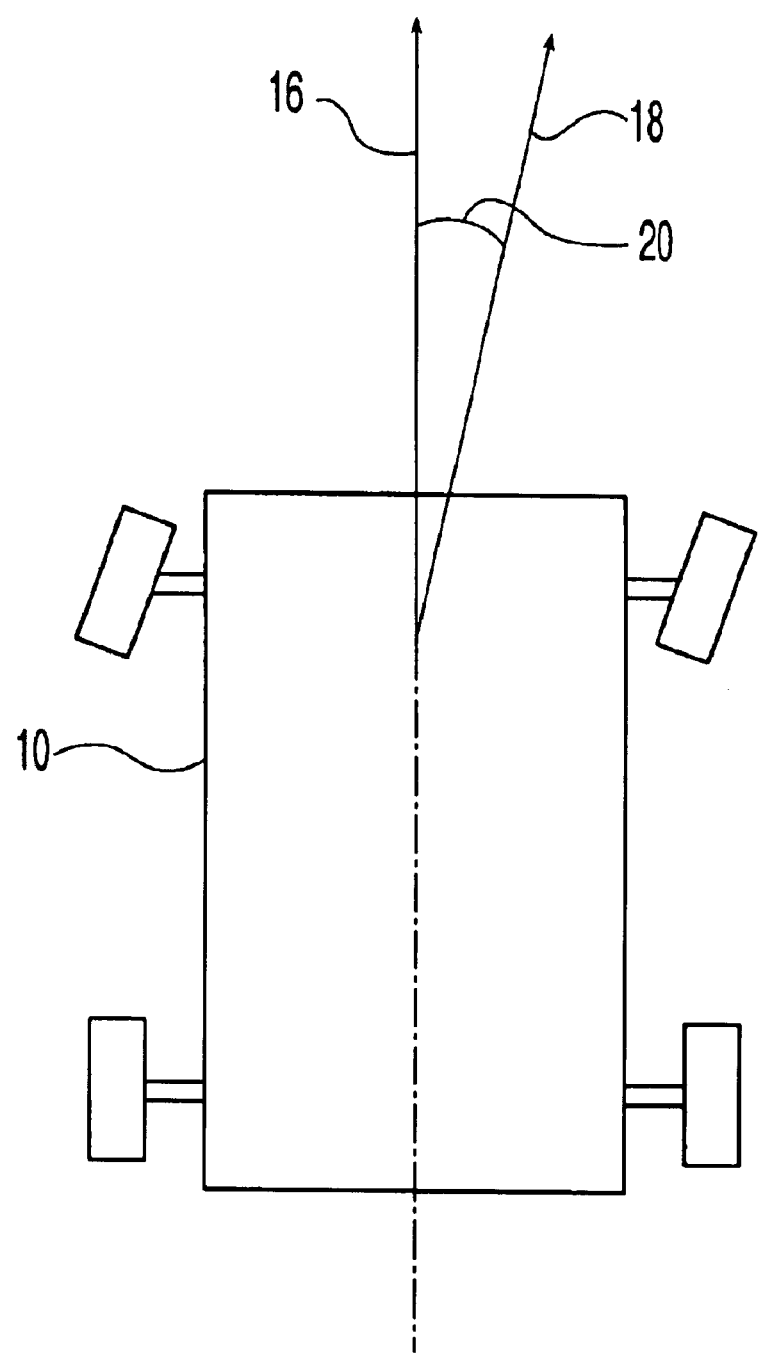
FIG. 9 is schematic illustration of a vehicle.

Referring to the drawings, FIG. 1 illustrates a flow chart representing one embodiment of the present invention. The embodiment of the invention illustrated in FIG. 1 may be implemented in a vehicle having an ESP system which includes a electronic control unit ("ECU") and various sensors for detecting vehicle operating parameters which include an SAS, yaw rate, longitudinal speed and lateral acceleration sensors. FIG. 9 schematically represents a vehicle 10 which has a heading indicated by line 16, i.e., the direction in which the longitudinal axis of vehicle 10 is pointed, and is traveling in a direction indicated by line 18. The angle 20 between heading 16 and travel direction 18 is the slip angle of vehicle 10.

In the embodiment represented by the flow chart in FIG. 1, a comprehensive vehicle dynamics model is formulated which is valid not only when the vehicle is in a steady state but also when the vehicle is in a non-steady state of operation. More specifically, the vehicle dynamics model which is used is valid not only when the yaw rate and body slip angle of the vehicle are constant (i.e., in a steady state) but also when the yaw rate and/or body slip angle of the vehicle are changing (i.e., a non-steady state). A vehicle dynamics model which has been reformulated such that the steering angle offset value is a state variable is used in the embodiment represented in FIG. 1. The Kalman-filter or a state observer is applied to the reformulated vehicle model to estimate the steering angle offset, $\delta_{off}$, and other vehicle operating parameters such as the body slip angle, $\beta$. This process for estimating the steering angle offset and body slip angle is discussed in greater detail below and is represented by box 12 in the Figures. The use of a vehicle dynamics model which is valid in a non-steady state allows the estimation process to be used in a wide range of driving and road conditions.

The estimated steering angle offset values, $\hat{\delta}_{off}$, are then filtered and combined with the steering angle value, $\delta_{Uncenter}$, to provide a true steering angle position, $\delta_{Center}$, value. This filtering and determination process is discussed in greater detail below and is represented by box 14 in FIG. 1. The estimated operating parameter values, e.g., the body slip angle and yaw rate, provided by the estimation process 12, together with the estimated steering angle position provided by the filtering and determination process 14, may then be used by the ESP system to control the operation of the vehicle as represented by box 15 in FIG. 1. The use of ESP systems to control a vehicle to maintain the stability of the vehicle based upon input data representing various operating parameters of the vehicle such as the steering angle position, longitudinal speed, and yaw rate of the vehicle, is known to those having ordinary skill in the art.

To implement the present invention, a vehicle dynamics model must first be formulated for the vehicle in which the present invention will be employed. The model used to describe the vehicle dynamics may be a simplified linear model. The model includes the steering angle position and can be reformulated, as described below, so that the steering angle offset is a state variable. Reformulating the model so that steering angle offset is a state variable facilitates the use of the Kalman-filter or a state-observer with the model in the estimation of a value for the steering angle offset. More complex vehicle models including the steering angle position and which may be reformulated so that the steering angle offset is a state variable may also be used.

Equation (1.1) presented below is a linear vehicle dynamics model:

$$\begin{bmatrix} \dot\beta \\ \ddot\psi \end{bmatrix} = \begin{bmatrix} -\dfrac{C_v + C_h}{mv} & \dfrac{C_h l_h - C_v l_v}{mv^2} - 1 \\ \dfrac{C_h l_h - C_v l_v}{J_z} & -\dfrac{C_v l_v^2 + C_h l_h^2}{J_z v} \end{bmatrix} \begin{bmatrix} \beta \\ \dot\psi \end{bmatrix} + \begin{bmatrix} \dfrac{C_v}{mv i_s} \\ \dfrac{C_v l_v}{J_z i_s} \end{bmatrix} \cdot \delta \quad (1.1)$$

wherein:

$\beta$ represents the body slip angle;

$\dot\psi$ represents the yaw rate;

$\delta$ represents the steering angle and is the system input signal;

m represents the mass of the vehicle;

v represents the longitudinal speed of the vehicle;

$J_z$ represents the inertia moment of the vehicle around its mass center point;

$i_s$ represents the steering angle ratio;

$C_v$ represents the cornering stiffness value of front tires;

$C_h$ represents the cornering stiffness value of the rear tires;

$l_v$ represents the distance from the front axle to the mass center point of the vehicle; and $l_h$ represents the distance from the rear axle to the mass center point of the vehicle.

If the vehicle utilizes a relative position steering angle sensor and the steering angle offset $\delta_{off}$ is unknown, the absolute steering angle $\delta$ can be calculated in accordance with equation (1.2) as the sum of the relative steering angle $\delta_{Uncenter}$ and the steering angle offset $\delta_{off}$ as follows:

$$\delta = \delta_{Uncenter} + \delta_{off} \quad (1.2)$$

The value for the steering angle offset, $\delta_{off}$, is a constant value during any one vehicle trip. The inventors of the present application have used this characteristic of the steering angle offset, $\delta_{off}$, to rewrite equation (1.1) as follows:

$$\begin{bmatrix} \dot{\beta} \\ \ddot{\psi} \\ \dot{\delta}_{Off} \end{bmatrix} = \begin{bmatrix} \frac{C_v + C_h}{mv} & \frac{C_h l_h - C_v l_v}{mv^2} - 1 & \frac{C_v}{mvi_s} \\ \frac{C_h l_h - C_v l_v}{J_z} & -\frac{C_v l_v^2 + C_h l_h^2}{J_z v} & \frac{C_v l_v}{J_z i_s} \\ 0 & 0 & 0 \end{bmatrix} \begin{bmatrix} \beta \\ \dot{\psi} \\ \delta_{Off} \end{bmatrix} + \begin{bmatrix} \frac{C_v}{mvi_s} \\ \frac{C_v l_v}{J_z i_s} \\ 0 \end{bmatrix} \cdot \delta_{Uncenter}, \quad (1.3)$$

which is a third order state equation. In equation (1.3), $\beta$, $\dot{\psi}$, $\delta_{Off}$, define the state variables. Using time index k, equation (1.3) can be approximately formulated in a standard discrete matrix form:

$$x(k+1) = A(k)x(k) + b(k) \cdot u(k)$$

$$y(k) = c^T x(k) \quad (1.4)$$

with $$A = \begin{bmatrix} a_{11} & a_{12} & b_1 \\ a_{21} & a_{22} & b_2 \\ 0 & 0 & 0 \end{bmatrix}$$

$$x^T = [\beta \dot{\psi} \delta_{Off}]$$

$$b = \begin{bmatrix} b_1 \\ b_2 \\ 0 \end{bmatrix} \quad (1.5)$$

$$u = \delta_{Uncenter}$$

and wherein
$c^T$ represents an output vector.
The output vector $c^T$ is dependent upon the measurable signals which are available as discussed in greater detail below.

Representing the process noise by v(k) and the measurement noise by w(k) and assuming both the process noise and the measurement noise to be independent random variables having an average value of zero, equation (1.4) can be rewritten as follows:

$$x(k+1) = A(k)x(k) + b(k) \cdot u(k) + v(k)$$

$$y(k) = c^T x(k) + w(k) \quad (1.6)$$

In accordance with modern control theory, a state-observer can be applied to equation (1.4) and the Kalman-filter can be applied to equation (1.6). In both cases, the state vector x(k) is estimated. Several different approaches may be used to resolve the vehicle dynamics model depending upon the signals which are available as input into the model and the desired output values. Four different approaches are described below.

In the first approach, the signals which are input into the model are the measured values for the yaw rate and longitudinal speed of the vehicle. The yaw rate and longitudinal vehicle speed may be either directly measured by sensor or be calculated from other directly measured values. For example, the longitudinal vehicle speed may be calculated from signals received from wheel speed sensors. In this first approach, the output vector $c^T$ is defined as follows:

$$c^T = [010]. \quad (1.7)$$

Employing equation (1.7), the Kalman-filter or state-observer can be applied to equations (1.4) and (1.6) respectively to obtain the steering angle offset value. The first approach thereby yields a steering angle offset value which may then be used by the ESP system.

In the second approach, the lateral acceleration $a_y$ is also available. The slip angle $\beta$ can be obtained by integrating $\dot{\beta}$ using the relationship:

$$a_y = v \cdot (\dot{\beta} + \dot{\psi}). \quad (1.8)$$

The slip angle $\beta$ which is thereby obtained is considered a measurement signal. In this second approach, the output vector $c^T$ is defined as follows:

$$c^T = [110]. \quad (1.9)$$

Employing equation (1.9), the Kalman-filter or state-observer can be applied to equations (1.4) and (1.6) respectively to obtain the steering angle offset value. The second approach thereby yields a slip angle value and steering angle offset value which may then be used by the ESP system.

The third approach is the same as the first approach except that the value for the slip angle which is calculated when estimating the steering angle offset value is provided as an output value so that it may be utilized by the ESP system. This third approach yields estimated values for both the slip angle and the steering angle offset.

The fourth approach is applicable where the steering angle offset value is a known input or where the vehicle employs a steering angle sensor which provides the absolute steering angle position rather than a relative steering angle position value. In this fourth approach, the Kalman-filter or a state-observer may be used with equation (1.1). Using the measured value of the yaw rate, the vehicle body slip angle may be calculated in a manner similar to that employed by the third approach. This fourth approach thereby yields an estimated value for the slip angle. It is not necessary to estimate a value for the steering angle offset in this fourth approach because the actual steering angle position is a known value.

Figure 2:
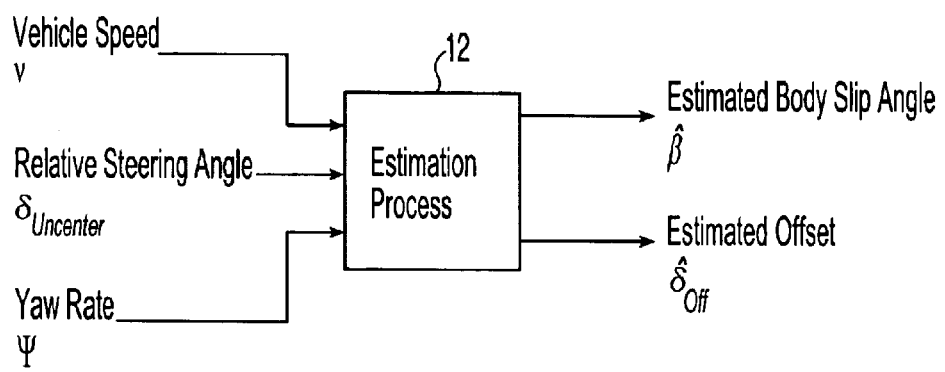
FIG. 2 is a flow chart representing the estimation of body slip angle and steering angle offset values based upon a first set of vehicle operating parameter signals.
Figure 3:
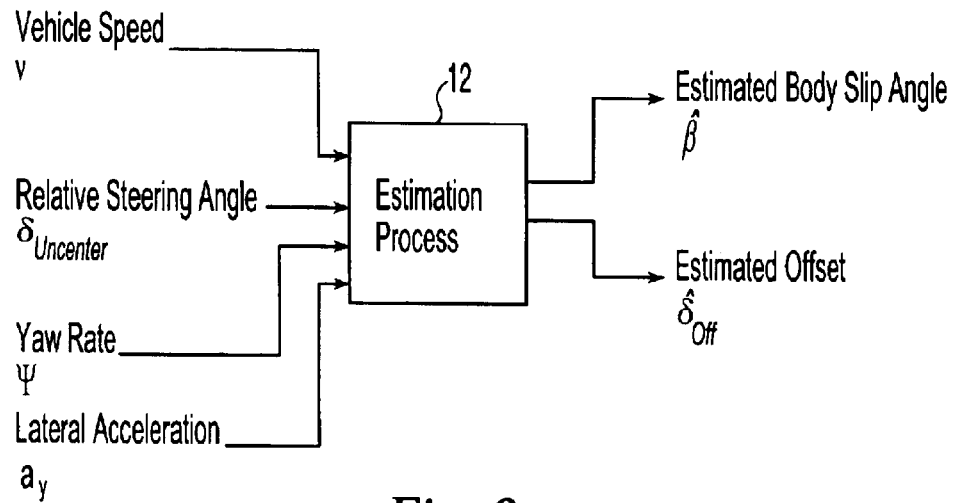
FIG. 3 is a flow chart representing the estimation of body slip angle and steering angle offset values based upon a second set of vehicle operating parameter signals.
Figure 4:
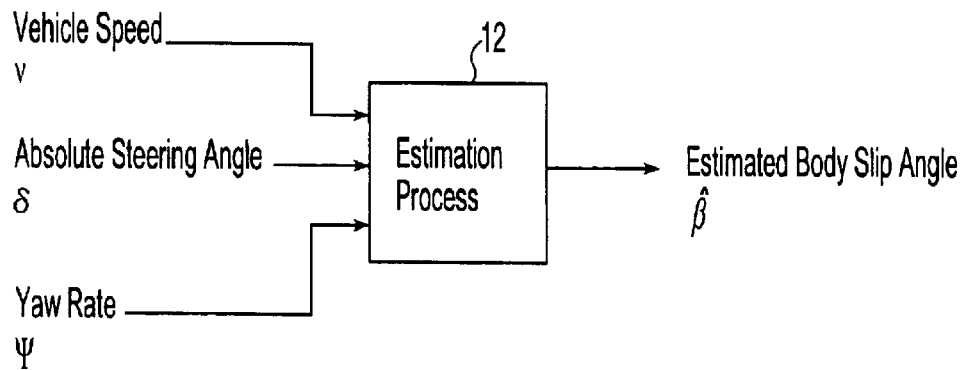
FIG. 4 is flow chart representing the estimation of body slip angle and steering angle values based upon a third set of vehicle operating parameter signals.

FIGS. 2–3 provide a graphical representation of the input and output values of the different approaches described above. FIG. 2 represents both the first and third approaches. In the first approach, however, the estimated body slip angle, although calculated, is not output to the ESP system. FIG. 3 represents the second approach and FIG. 4 represents the fourth approach.

Figure 5:
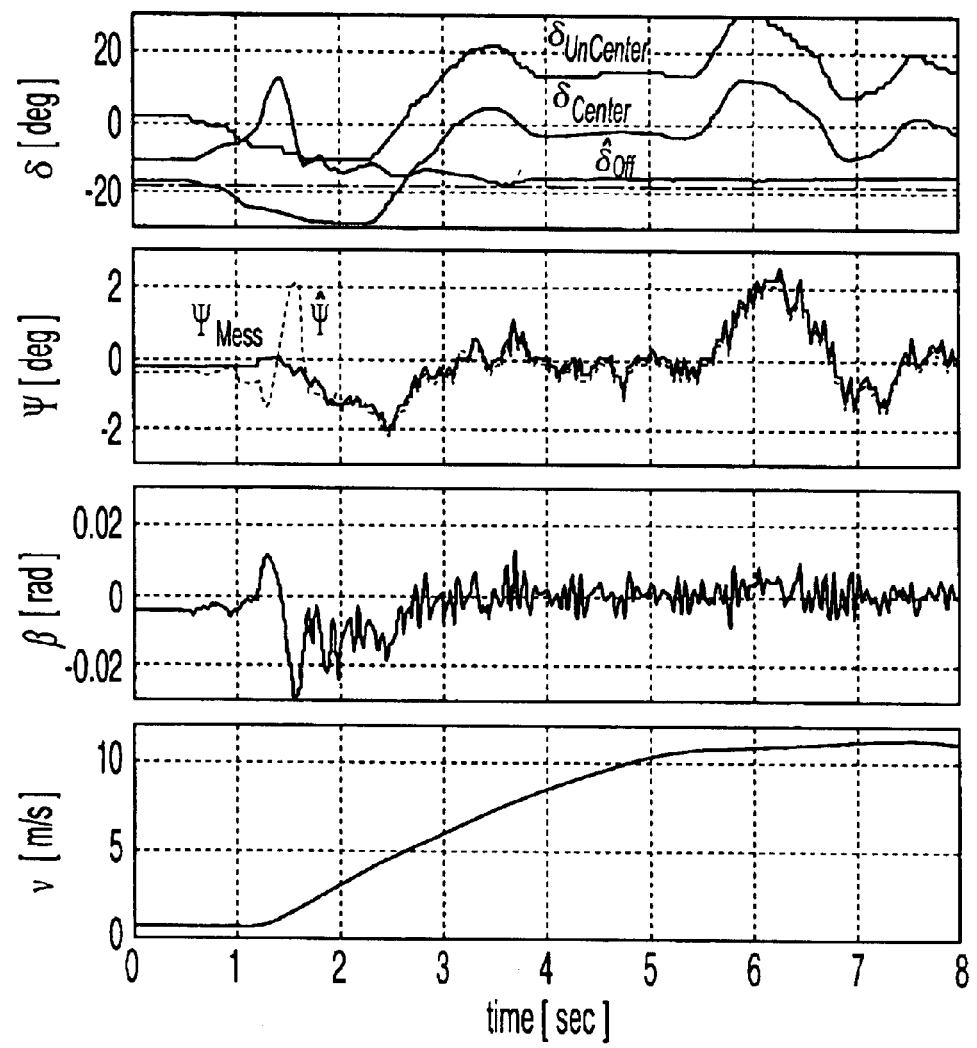
FIG. 5 is a graphical representation of data gathered during a first test of the present invention in which the vehicle's initial movement was in a straight forward path.

FIG. 5 illustrates the measurement and estimation signals of a test conducted using the first approach described above. The initial movement of the vehicle is straight ahead on an asphalt road. The input signal for the steering angle position is a relative position value instead of an absolute steering angle position. The value displayed for $\delta_{center}$ represents the absolute or true steering angle position. The value displayed for $\delta_{Uncenter}$ represents the relative steering angle position output of the sensor and is associated with an unknown steering angle offset value. In the test illustrated in FIG. 5, the steering angle offset value is −18.5 degrees. The value displayed for $\delta_{off}$ represents the estimated steering angle offset value. The estimation process begins when the vehicle first starts to move. In the test illustrated in FIG. 5, the estimated value for the steering angle offset converges with the actual value after 3.1 seconds. The value displayed for $\hat{\beta}$ represents the estimated vehicle body slip angle.

Figure 6:
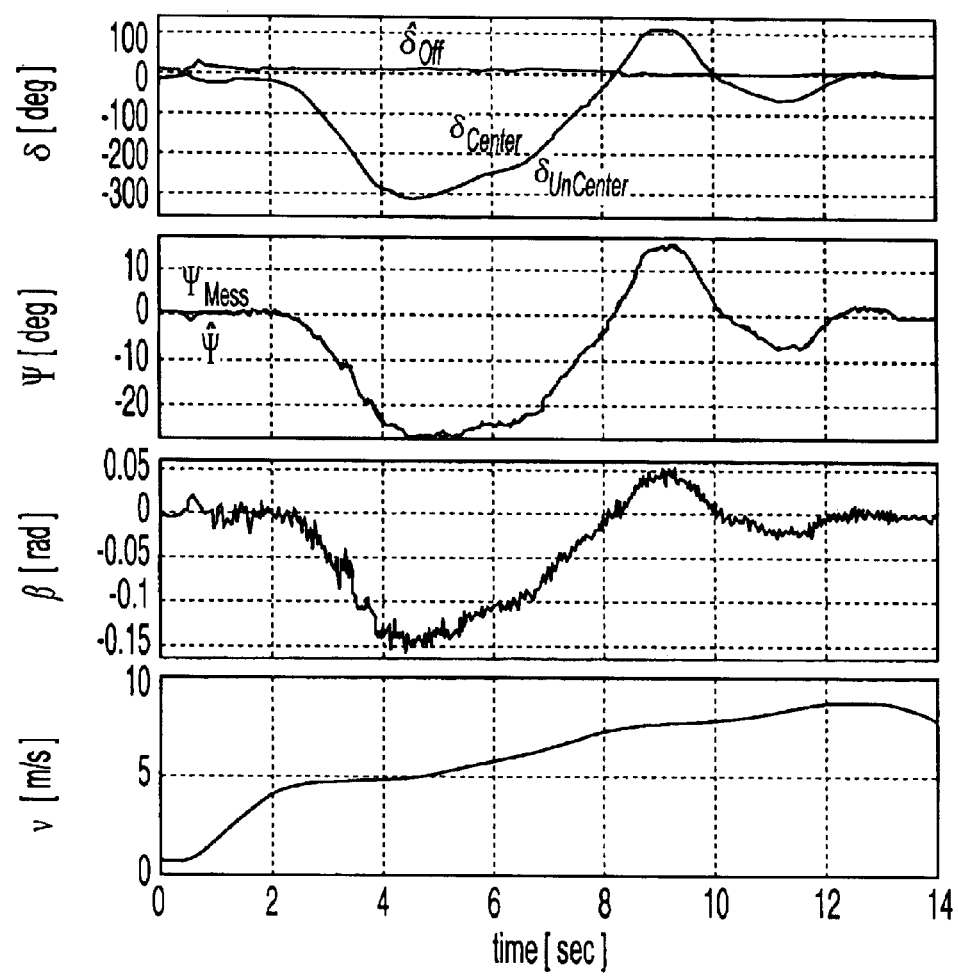
FIG. 6 is a graphical representation of data gathered during a second test of the present invention in which the vehicle's initial movement was a turning movement.

FIG. 6 illustrates the measurement and estimation signals of a second test. The second test is similar to the first test except that the vehicle is turning on an asphalt road when it is first launched into movement. In this second test example, the estimated steering angle offset value $\hat{\delta}_{off}$ off converges with actual offset value of 6.7 degrees after 8.4 seconds. Thus, it took a longer time for the estimated offset value to converge with the actual offset value when the model addressed the more dynamic conditions of a turn as opposed to the straight forward path of the first test illustrated in FIG. 5. The values of the relative steering angle position, $\delta_{Uncenter}$, and the measured yaw rate, $\psi_{Mess}$, are indicative of the dynamic cornering behavior of the vehicle.

One embodiment utilizing the Kalman filter with the first approach discussed above will now be further described.

The estimation process uses the linear vehicle dynamics model discussed above. The measured relative steering angle position, longitudinal vehicle speed and yaw rate are the input values used in the estimation of the steering angle position offset value $\hat{\delta}_{off}$. This process used to obtain the steering angle position offset value $\hat{\delta}_{off}$ is represented by box 12 in FIG. 1.

The resulting estimated offset value $\hat{\delta}_{off}$ is then filtered and added to the relative steering angle position $\delta_{Uncenter}$ to determine an estimated steering angle value. This filtering and determination process is represented by box 14 in FIG. 1.

As discussed above, the steering angle offset value may be estimated using equation (1.3):

$$\begin{bmatrix} \dot{\beta} \\ \ddot{\psi} \\ \dot{\delta}_{Off} \end{bmatrix} = \begin{bmatrix} \frac{C_v + C_h}{mv} & \frac{C_h l_h - C_v l_v}{mv^2} - 1 & \frac{C_v}{mvi_s} \\ \frac{C_h l_h - C_v l_v}{J_z} & -\frac{C_v l_v^2 + C_h l_h^2}{J_z v} & \frac{C_v l_v}{J_z i_s} \\ 0 & 0 & 0 \end{bmatrix} \begin{bmatrix} \beta \\ \dot{\psi} \\ \delta_{Off} \end{bmatrix} + \begin{bmatrix} \frac{C_v}{mvi_s} \\ \frac{C_v l_v}{J_z i_s} \\ 0 \end{bmatrix} \cdot \delta_{Uncenter}. \quad (1.3)$$

Also as discussed above, by using a time index k, this equation can be approximately formulated in a standard discrete matrix form:

$$x(k+1)=A(k)x(k)+b(k)\cdot u(k)+v(k)$$

$$y(k)=c^T x(k)+w(k) \quad (1.6)$$

wherein (for the first approach described above):

$$A = \begin{bmatrix} a_{11} & a_{12} & b_1 \\ a_{21} & a_{22} & b_2 \\ 0 & 0 & 0 \end{bmatrix},$$

$$x^T=[\beta\dot{\psi}\delta_{Off}],$$

$$b = \begin{bmatrix} b_1 \\ b_2 \\ 0 \end{bmatrix}, \quad (1.5a)$$

$u=\delta_{Uncenter}$ and $c^T=[0 1 0]$.

To obtain equation (1.6), the process noise v(k) and measurement noise w(k) are assumed to be independent random variables having an average value of zero. These model equations are then used to obtain an estimate of $\delta_{off}$.

As mentioned above, a state-observer can be applied to equation (1.4) or the Kalman-filter can be applied to equation (1.6). In this embodiment, the Kalman-filter is applied to equation (1.6). In both cases the state vector x(k) is estimated. The general form of the estimation in both cases can be given as:

$$\hat{x}(k+1)=A(k)\hat{x}(k)+b(k)\cdot u(k)+K(k)(y-\hat{y})$$

$$\hat{y}(k)=c^T\hat{x}(k) \quad (1.6a)$$

wherein $\hat{x}(k)=[\hat{\beta}\hat{\psi}\hat{\delta}_{Off}]^T$ and represents the estimated values of the body slip angle, yaw rate and steering angle offset, i.e., $\hat{\beta}$, $\hat{\psi}$, $\hat{\delta}_{Off}$. K(k) is the gain matrix calculated from A(k), b(k) and $c^T$ given by Equation (1.5) the use of such gain matrixes is known in the art.

The integration of the differential equation (1.6a) provides estimated values for the body slip angle, yaw rate and steering angle offset value. Thus, equation (1.6a) yields an estimate for the steering angle offset and each of the two measurable values (yaw rate and body slip angle) described by y(k). If measured values are available for either or both of these operating parameters, the estimated values may be compared to the measured values. The difference between the estimated values and the measured values, $(y-\hat{y})$, is referred to as the model difference or model error. If such an approach is taken, the determination of the estimated values may be made after the estimated values have converged with the corresponding measured value(s), i.e., when $(y-\hat{y})=0$.

Returning to the gain matrix K(k) of equation (1.6a), the gain matrix K(k) will differ depending upon whether equation (1.6a) is obtained from the application of the Kalman-filter to equation (1.6) or a state-observer to equation (1.4). When equation (1.6a) is obtained by applying the Kalman-filter to equation (1.6), the gain matrix K(k) may be defined as follows:

$$K(k)=P(k)c[c^T(k)P(k)c+R(k)]^{-1}$$

$$P(k+1)=A(k)M(k)A^T(k)+Q(k),$$

$$M(k)=P(k)-K(k)c^T P(k) \quad (1.6b)$$

wherein R(k) and Q(k) are adjustable matrixes and relate to noise. When equation (1.6a) is obtained by applying a state-observer to equation (1.4), the gain matrix K(k) may be defined as follows:

$$K(k)=P(k)c[c^T(k)P(k)c+I]^{-1}$$

$$P(k+1)=A(k)M(k)A^T(k)$$

$$M(k)=P(k)-K(k)c^T P(k) \quad (1.6c)$$

wherein I is an unit matrix. As discussed above, the difference between the estimated values and the measured values is referred to as the model difference or model error. According to Kalman-filter and state-observer theory, for equation (1.6a) the defined signals x̂(k) will converge to x(k) and ŷ will converge to y, i.e., the estimated state variables will converge to their true values and the estimates of the measurable signals will converge to the measured values. In other words, the model error tends toward zero.

One embodiment of the filtering and determination process represented by box 14 will now be described. In the exemplary embodiment, the values obtained for doff are filtered in accordance with the following equation:

$$\delta_{Off,k+1} = \delta_{Off,k} + F_k \cdot (\hat{\delta}_{Off} - \delta_{Off,k}). \tag{2.1}$$

wherein:
k represents the time index; and
$F_k$ represents the filter coefficient.
This filtering process functions similar to a low-pass filter.

Filter coefficients are typically constant. The filter coefficient utilized in this process is not a constant, however, but a function which depends on the uncertainty of the estimated signal and is defined as follows:

$$F_k = T(1 - Q_k) \tag{2.2}$$

wherein:

$$Q_{k+1} = Q_k + T(1 - Q_k) \tag{2.3}$$

and T is a time-varying coefficient which is defined as:

$$T = c_0(1 - U_k Q_k) \tag{2.4}$$

wherein:
$c_0$ represents a constant which may be used to adjust the value of T; and
$U_k$ represents the uncertainty of the estimated signals.

The value of $U_k$ is representative of the scattered range of values which surround the signal being estimated. There are multiple ways of calculating a value for $U_k$ and the value of $U_k$ advantageously varies with the current driving situation, e.g., whether the vehicle is in a long turn, on a rough road or whether the steering angle is being rapidly changed. For the filter to accurately reflect the dynamic behavior of the vehicle, it is desirable for the uncertainty factor $U_k$ to reflect the current dynamic characteristics of the vehicle. The uncertainty factor $U_k$ of the present embodiment is defined as follows:

$$U_k = c_\psi (\dot{\psi} \cdot \int \dot{\psi} dt) + c_\delta \cdot |\delta_{uncenter} + \hat{\delta}_{off}| + C_y |\alpha_y - \hat{\delta}_y|, \tag{2.5}$$

wherein:
$\dot{\psi}$ represents the yaw rate of the vehicle;
$a_y$ represents the lateral acceleration of the vehicle; and
$c_p$, $c_\delta$, and $c_y$ represent normalization factors to maintain $U_k < 1$.

The first term of equation (2.5) is dependent upon the yaw rate and reflects uncertainty associated with the change of driving direction. The second term of equation (2.5) is equivalent to the estimated steering angle and reflects uncertainty associated with a change in driving direction as represented by a change in the steering angle. For example, the steering angle will have a greater effect on the uncertainty when it is larger, e.g., larger than 30°, and the second term reflects a larger uncertainty for larger steering angle magnitudes. The third term of equation (2.5) is used if the measured value of the lateral acceleration is available. This third term reflects the deviation between the estimated lateral acceleration and the measured lateral acceleration and, thus, reflects an objective measurement of the deviation between the model used to estimate the dynamic behavior of the vehicle and the actual measured behavior of the vehicle.

As set forth above in equation (2.3), Q is auxiliary signal and tends toward 1.0 as k approaches ∞. Consequently, the filtered signal reaches a steady state as k approaches ∞. This allows the value of Q to be used as an indicator for determination, i.e., a $Q_{set}$ may be chosen and when $Q = Q_{set}$ the filtering process is complete, the "flag" value is set at 1 and a final value for the steering angle offset is selected. For example, $Q_{set}$ may be defined within the following range:

$$0.9 < Q_{set} < 1.0. \tag{2.6}$$

Figure 7:
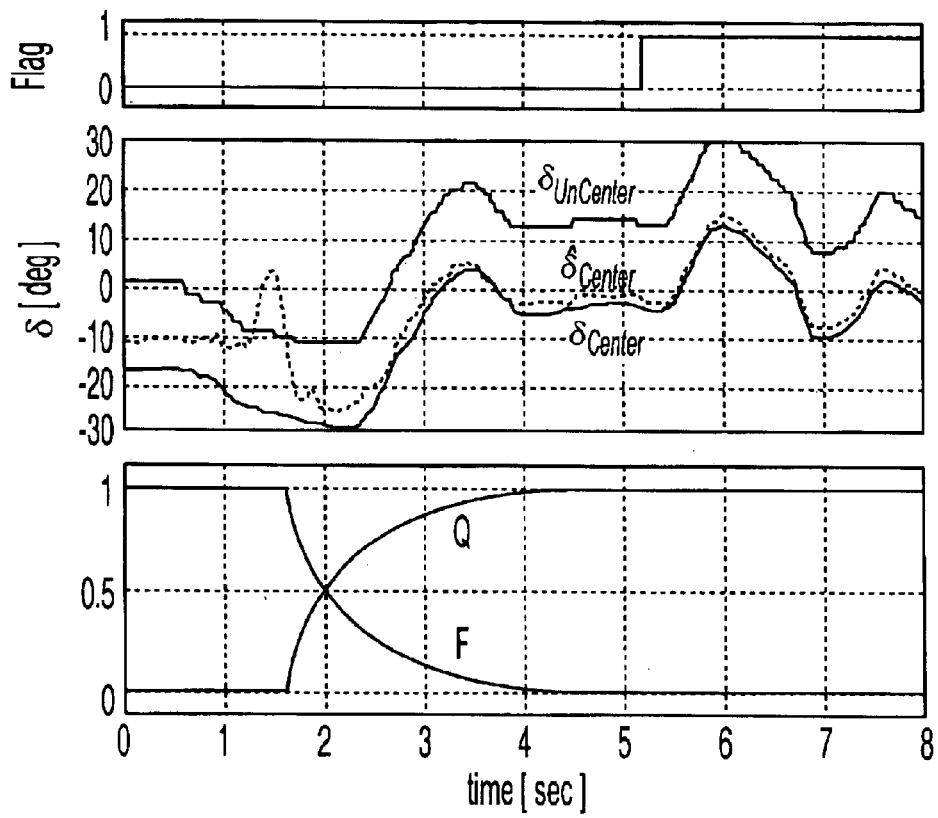
FIG. 7 is a graphical representation of additional data associated with the estimation and filtering of the steering angle offset value gathered during the first test of the present invention.
Figure 8:
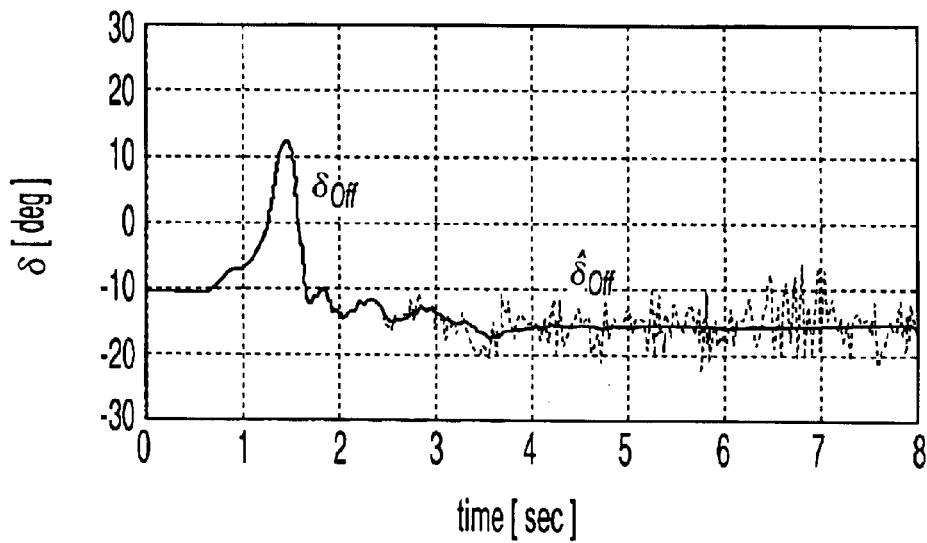
FIG. 8 is a graphical representation of the estimated value of the steering angle offset gathered during the first test of the present invention.

The first test described above and having results illustrated in FIG. 5, successfully utilized the above described method using the Kalman-filter with the first approach. FIGS. 7 and 8 further illustrate the results of this first test. The center graph shown in FIG. 7 displays the true or absolute steering angle position $\delta_{center}$, the uncorrected relative steering angle position signal $\delta_{Uncenter}$, and the estimated steering angle offset value $\hat{\delta}_{off}$. As mentioned above, the actual steering angle offset value for this first test was −18.5 degrees and it took 3.1 seconds for the system to converge on this value. The bottom graph of FIG. 7 illustrates the values of Q and variable filter coefficient F as the estimated offset value converges with the actual steering angle offset value. The top graph of FIG. 7 illustrates the value of the flag.

FIG. 8 illustrates the value of the estimated steering angle offset value. Both the filtered, $\delta_{off}$, and unfiltered, $\hat{\delta}_{off}$, values of the estimated steering angle offset value are illustrated. The more variable line indicates the unfiltered estimated value.

The value of $Q_{set}$ selected for this test was 0.98 and when the value of Q reached 0.98 the flag was set and a final estimated value of the steering angle offset value was selected to continuously correct the relative steering angle position signal. As can be seen in the top graph of FIG. 7, it took slightly longer than 5 seconds for the value of Q to reach the $Q_{set}$ value of 0.98 and the flag to be set at 1. Upon the setting of the flag to 1, the final estimated value of the steering angle offset is used to correct the output of the relative position steering angle sensor until the vehicle is turned off. The process for estimating the steering angle offset value is repeated when the ignition is once again turned on.

The value of $Q_{set}$ may be selected for a particular vehicle system after conducting numerous tests and empirically determining the length of time required for the estimated value of the steering angle offset to converge with the actual offset value under various conditions. With this empirical data, an appropriate value for $Q_{set}$ may be selected.

While this invention has been described as having an exemplary design, the present invention may be further modified within the spirit and scope of this disclosure. This application is therefore intended to cover any variations, uses, or adaptations of the invention using its general principles.

What is claimed is:

1. A method of estimating a steering angle offset value in a vehicle having a relative position steering angle sensor, said method comprising:
   providing a mathematical expression for calculating an estimated steering angle offset value, $\hat{\delta}_{off}$, based upon at least one measured value of a vehicle operating parameter wherein said mathematical expression is definable by:
      selecting a mathematical model to describe the dynamic behavior of the vehicle which includes a first variable, δ, representing the steering angle of the vehicle, wherein said mathematical model includes at least one of a Kalman filter and a state observer; and substituting, for said first variable, δ, the sum of a second variable, $\delta_{Uncenter}$, representing the relative steering angle position and a third variable, $\delta_{off}$, representing the steering angle offset in said model to provide said mathematical expression;

obtaining said at least one measured value for said vehicle; and estimating said steering angle offset value using said at least one measured value and said mathematical expression.

2. The method of claim 1 wherein said third variable is a state variable with respect to said mathematical expression.

3. The method of claim 1 wherein said at least one measured value includes the yaw rate of the vehicle.

4. The method of claim 1 wherein said at least one measured value includes the yaw rate of the vehicle and the relative steering angle position.

5. The method of claim 1 wherein said at least one measured value includes the yaw rate of the vehicle, the relative steering angle position and the longitudinal velocity of the vehicle.

6. The method of claim 1 further comprising the estimation of the body slip angle of the vehicle using said at least one measured value and said mathematical expression.

7. The method of claim 1 wherein said model comprises:

$$\begin{bmatrix} \dot{\beta} \\ \ddot{\psi} \end{bmatrix} = \begin{bmatrix} -\dfrac{C_v + C_h}{mv} & \dfrac{C_h l_h - C_v l_v}{mv^2} - 1 \\ \dfrac{C_h l_h - C_v l_v}{J_z} & -\dfrac{C_v l_v^2 + C_h l_h^2}{J_z v} \end{bmatrix} \begin{bmatrix} \beta \\ \dot{\psi} \end{bmatrix} + \begin{bmatrix} \dfrac{C_v}{mvi_s} \\ \dfrac{C_v l_v}{J_z i_s} \end{bmatrix} \cdot \delta$$

wherein:
β represents the body slip angle;
$\dot{\psi}$ represents the yaw rate;
δ represents the steering angle;
m represents the mass of the vehicle;
v represents the longitudinal speed of the vehicle;
$J_z$ represents the inertia moment of the vehicle around its mass center point;
$i_s$ represents the steering angle ratio;
$C_v$ represents the cornering stiffness value of front tires;
$C_h$ represents the cornering stiffness value of the rear tires;
$l_v$ represents the distance from the front axle to the mass center point of the vehicle; and
$i_h$ represents the distance from the rear axle to the mass center point of the vehicle.

8. The method of claim 7 wherein said step of substituting the sum of said second and third variables in said model provides a mathematical expression which states:

$$\begin{bmatrix} \dot{\beta} \\ \ddot{\psi} \\ \dot{\delta}_{Off} \end{bmatrix} = \begin{bmatrix} -\dfrac{C_v + C_h}{mv} & \dfrac{C_h l_h - C_v l_v}{mv^2} - 1 & \dfrac{C_v}{mvi_s} \\ \dfrac{C_h l_h - C_v l_v}{J_z} & -\dfrac{C_v l_v^2 + C_h l_h^2}{J_z v} & \dfrac{C_v l_v}{J_z i_s} \\ 0 & 0 & 0 \end{bmatrix} \begin{bmatrix} \beta \\ \dot{\psi} \\ \delta_{Off} \end{bmatrix} + \begin{bmatrix} \dfrac{C_v}{mvi_s} \\ \dfrac{C_v l_v}{J_z i_s} \\ 0 \end{bmatrix} \cdot \delta_{Uncenter}$$

9. The method of claim 8 wherein said step of substituting the sum of said second and third variables further comprises reformulating said model after substituting said sum, said step of reformulating said model provides a mathematical expression which comprises:

$$x(k+1) = A(k)x(k) + b(k) \cdot u(k) + v(k)$$

$$y(k) = c^T x(k) + w(k)$$

wherein:
k represents a time index, $$A = \begin{bmatrix} a_{11} & a_{12} & b_1 \\ a_{21} & a_{22} & b_2 \\ 0 & 0 & 0 \end{bmatrix},$$

$x^T = [\beta \dot{\psi} \delta_{Off}]$, $$b = \begin{bmatrix} b_1 \\ b_2 \\ 0 \end{bmatrix},$$

$u = \delta_{Uncenter}$,
v(k) represents the process noise,
w(k) represents the measurement noise, and
$c^T = [0 \ 1 \ 0]$.

10. The method of claim 1 wherein said step of estimating said steering angle offset value includes use of the mathematical expression which comprises:

$$\hat{x}(k+1) = A(k)\hat{x}(k) + b(k) \cdot u(k) + K(k)(y - \hat{y})$$

$$\hat{y}(k) = c^T \hat{x}(k)$$

wherein $\hat{x}(k) = [\hat{\beta} \hat{\dot{\psi}} \hat{\delta}_{Off}]^T$;

$\hat{\beta}$ represents the estimated value of the body slip angle;
$\hat{\dot{\psi}}$ represents the estimated value of the yaw rate;
$\hat{\delta}_{off}$ represents the estimated value of the steering angle offset;
K(k) represents a gain matrix.

11. The method of claim 1 further comprising the steps of:
estimating a plurality of steering angle offset values; and
filtering said plurality of estimated steering angle offset values.

12. The method of claim 10 wherein said filtering step comprises using a variable filter coefficient, $F_k$.

13. The method of claim 11 wherein said variable filter coefficient is calculated using an uncertainty factor, $U_k$, said uncertainty factor, $U_k$, being determined using at least one value from the group including the yaw rate of the vehicle, the estimated steering angle position and the lateral acceleration of the vehicle.

14. The method of claim 12 wherein said uncertainty factor, $U_k$, is determined using the following equation:

$$U_k = c_\psi(\dot\psi \cdot \int \dot\psi dt) + c_\delta \cdot |\delta_{uncenter} + \hat\delta_{off}| + c_y |a_y - \hat a_y|,$$

wherein:

$\delta_{Uncenter}$ represents the uncorrected relative steering angle position;

$\hat\delta_{off}$ represents the estimated steering angle offset;

$\delta_{Uncenter} + \hat\delta_{off}$ represents the estimated steering angle position;

$\dot\psi$ represents the yaw rate of the vehicle;

$a_y$ represents the lateral acceleration of the vehicle; and $c_P$, $c_\delta$, and $c_y$ represent constants.

15. A method of filtering a plurality of time indexed values in a process for determining a steering angle position of a vehicle having a relative position steering angle sensor, said method comprising:

estimating a plurality of time indexed steering angle offset values using at least one of a Kalman filter and a state observer;

filtering a plurality of time indexed values which are a function of said plurality of time indexed steering angle offset values using a variable filter coefficient, $F_k$, said variable filter coefficient, $F_k$, being determined using an uncertainty factor, $U_k$, said uncertainty factor, $U_k$, being determined using at least one value from the group including yaw rate of the vehicle, estimated steering angle position and the lateral acceleration of the vehicle.

16. The method of claim 15 wherein said plurality of time indexed values is identical to said plurality of time indexed steering angle offset values.

17. The method of claim 15 wherein said uncertainty factor, $U_k$, is determined using the following equation:

$$U_k = c_\psi(\dot\psi \cdot \int \dot\psi dt) + c_\delta \cdot |\delta_{uncenter} + \hat\delta_{off}| + c_y |a_y - \hat a_y|,$$

wherein:

$\delta_{uncenter}$ represents the uncorrected relative steering angle position;

$\hat\delta_{off}$ represents the estimated steering angle offset;

$\delta_{uncenter} + \hat\delta_{off}$ represents the estimated steering angle offset;

$\dot\psi$ represents the yaw rate of the vehicle;

$a_y$ represents the lateral acceleration of the vehicle; and $c_p$, $c_\delta$, and $c_y$ represents constants.

18. The method of claim 17 wherein said filtering step comprises the use of the formula:

$$\delta_{off,k+1} = \delta_{off,k} + F_k \cdot (\hat\delta_{off} - \delta_{off,k})$$

wherein:

K represents the time index; and the filter coefficient, $F_k$, is defined as:

$$F_k = T(1 - Q_k)$$

wherein:

$$Q_{k+1} = Q_k + T \cdot (1 - Q_k)$$

and T is defined as:

$$T + C_0(1 - U_k Q_k)$$

wherein:

$c_o$ represents a constant.

* * * * *